United States Patent [19]

Ball

[11] 3,820,034

[45] June 25, 1974

[54] DIGITAL SIGNAL REGENERATORS

[75] Inventor: John Robin Ball, Ipswich, England

[73] Assignee: The Post Office, London, England

[22] Filed: Mar. 9, 1973

[21] Appl. No.: 339,723

[30] Foreign Application Priority Data

Mar. 14, 1972 Great Britain .................... 11774/72

[52] U.S. Cl. ..................... 328/164, 328/127, 331/12

[51] Int. Cl. ............................................. H03b 1/00

[58] Field of Search ...... 328/164, 165, 127; 331/10, 331/12

[56] References Cited

UNITED STATES PATENTS

| | | | |
|---|---|---|---|
| 3,130,375 | 4/1964 | Roiter et al. | 331/10 X |
| 3,308,387 | 3/1967 | Hackett | 328/155 |
| 3,337,814 | 8/1967 | Brase et al. | 328/155 X |

*Primary Examiner*—Rudolph V. Rolinec
*Assistant Examiner*—B. P. David
*Attorney, Agent, or Firm*—Hall & Houghton

[57] ABSTRACT

A digital signal regenerator in which a local oscillator is synchronised with an incoming signal by means of a conventional second order phase locked loop, but the regenerated signals are timed by an oscillator controlled by the time integral of the error signals from the phase locked loop without any damping. In the described example a single oscillator is used and the linear damping term is introduced by means of a phase shifter effective on the oscillations from the oscillator to shift their phase by an amount dependent on the time integral of the error signal. In addition to a trigger circuit timing the regenerated digital signals, a second trigger is provided controlled by the phase shifted oscillations as a discriminator for receiving the input digital signals.

6 Claims, 1 Drawing Figure

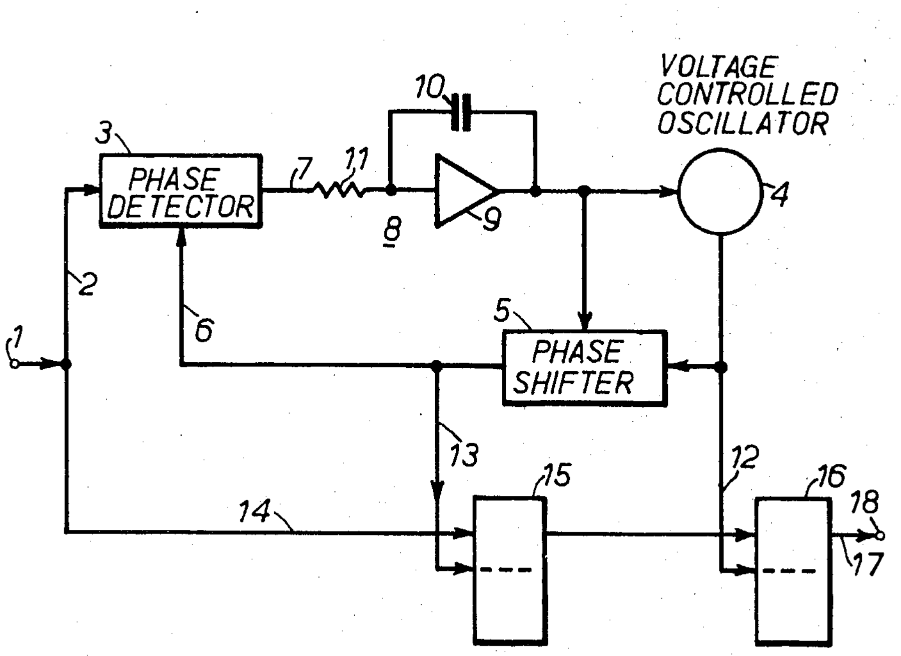
VOLTAGE
CONTROLLED
OSCILLATOR
PHASE
DETECTOR
PHASE
SHIFTER
1
2
3
4
5
6
7
8
9
10
11
12
13
14
15
16
17
18

DIGITAL SIGNAL REGENERATORS

This invention relates to apparatus for regenerating digital signals, and, in particular, relates to such apparatus including a phase locked loop for producing a local clock signal used for timing the digital signals outgoing from the regenerator.

The simplest form of phase locked loop is known as a first-order phase locked loop and includes a phase detector for comparing the phase of an incoming digital signal with the phase of a locally generated clock signal to produce a phase error voltage which is used to control the frequency and therefore the phase of the clock oscillator. This simple arrangement has the disadvantage that if the free running frequency of the clock oscillator is offset from the frequency of the incoming signals then there must be a phase offset between the clock signals and the incoming signals, sufficient to produce the phase error voltage necessary to cause the clock oscillator to generate oscillations of the correct frequency. This phase offset is undesirable in a digital regenerator, because the decision circuit used to identify the digits of the incoming signal which depends on the locally generated clock signals for its operation, can only perform optimally when the clock signal bears a certain fixed phase relationship to the incoming signal. The phase offset which results from the frequency offset can be reduced by increasing the loop gain of the phase locked loop, but this makes the loop, and therefore the regenerator, more sensitive to jitter in the incoming signals.

The problem of phase offset described above can be overcome in what is termed a second-order phase locked loop, in which the error signal from the phase detector is applied to control the clock oscillator through a filter network having a low pass characteristic which provides some integration of the signal. The effect of the filter is to store as a charge on a capacitor the voltage necessary to produce the necessary frequency offset of the clock oscillator, and therefore, the residual phase error tends to zero if the integration is effected with an integrating amplifier of which the gain is large. Unfortunately in such an arrangement phase jitter at a particular low frequency in the incoming digital signals is not attenuated because the jitter characteristic must include a linear component to damp out hunting of the clock oscillator frequency which would otherwise occur. It can be shown that with a second-order phase locked loop of high gain the low frequency phase jitter is amplified.

It is an object of the present invention to provide a digital signal regenerator in which the problems of phase offset and phase jitter are substantially reduced.

According to the present invention there is provided apparatus for regenerating digital signals having means for producing first and second oscillations, means for comparing the first oscillation with an input digital signal to produce an error signal representing the phase difference between the first oscillation and the input digital signal, the frequency of the first oscillation being dependent on the time integral of the error signal the integral incorporating a damping term, and the frequency of the second oscillation being dependent on the time integral of the error signal without a damping term, and means responsive to the second oscillation to form regenerated digital signal in response to the input digital signals.

One example of the apparatus of the present invention is a modified second order phase locked loop in which a linear damping term, which is added to the time integral of the error signal to produce the control voltage for a clock oscillator, is provided by means of a phase shifter effective on the clock oscillation generated by the clock oscillator to produce the first oscillation, the oscillator and the phase shifter both being controlled by the time integral of the error signal. The separation of the damping term for the control of the clock oscillator frequency by the time integral of the error signal in this way has the result that the clock signals from the oscillator, which are the second oscillation, are substantially unaffected by the jitter in the incoming signals and can be used to time the outgoing signals. The damping factor in the phase locked loop is, of course, essential to eliminate hunting which would occur if the damping were not provided. Alternatively, the first and second oscillations could be generated by separate oscillators.

In order that the invention may be fully understood and readily carried into effect, it will now be described with reference to the single FIGURE of the accompanying drawing, which shows in block diagrammatic form one example of a digital signal regenerator according to the invention.

Referring to the drawing, the input digital signals are applied to a terminal 1, and are fed therefrom via a conductor 2 to one input of a phase detector 3. The other signals fed to the phase detector 3 are derived from a voltage controlled oscillator 4 after passage through a voltage controlled phase shifter 5 and are applied to the phase detector 3 via a conductor 6. The error signal output from the detector 3 appears on a conductor 7 and is applied to an integrator 8 consisting of an inverting d.c. amplifier 9 having a feedback capacitor 10 and an input resistor 11. The output signal from the integrator 8 is applied to control the frequency of the oscillator 4 and also the phase shift introduced by the phase shifter 5. The components thus far described constitute a phase locked loop which generated two output oscillations. The first oscillation is a decision clock signal which is obtained from the output of the phase shifter 5 on a conductor 13. The second oscillation is an output clock signal which is obtained directly from the oscillator 4 and appears on a conductor 12.

The input digital signal applied to the terminal 1 is also fed over a conductor 14 to the setting input of a trigger 15. The set output from the trigger 15 is applied to the setting input of a second trigger 16. The set output of the trigger 16 appears on a conductor 17 which is connected to an output terminal 18. The decision clock signal from the output of the phase shifter 5 on the conductor 13 is applied to the clock input of the trigger 15. The output clock signal from the oscillator 4 is applied over the conductor 12 to the clock input of the trigger 16. The triggers 15 and 16 are such that they are set or reset in response to the condition, "1" or "0," of the signal on their setting inputs at the time that a signal is applied to their clock inputs.

In the operation of the apparatus described above the phase locked loop including components 2 to 11 operates in the same manner, as far as the input signals are concerned, as a second-order phase locked loop. Thus, assuming that the clock signal from the oscillator 4 after phase shift by the phase shifter 5 is not in phase with the incoming digital signals on the conductor 2, then the phase detector 3 produces an error output signal on the conductor 7 which causes a correction voltage to be set up in the capacitor 10. Since the amplifier 9 is an inverting d.c. amplifier and it is provided with negative feedback, its input tends to be a virtual earth point, so that the output voltage from the integrator 8 is substantially equal to the voltage stored on the capacitor 10. The accumulated error signals in the capacitor 10 control the frequency of the oscillator 4 in such a way as to tend to bring the output oscillation from the phase shifter 5 into synchronism with the incoming digital signals. However, because the control of the oscillator 4 is one of frequency, the phase shift introduced by the control voltage is cumulative, and it will be appreciated that if the phase shifter 5, or some equivalent, were not provided then the phase locked loop would cause the frequency of the oscillator 4 to oscillate continually at a frequency dependent on the sensitivity of the phase detector, the gain of the integrator and the sensitivity to control of the oscillator 4. In order to eliminate this hunting, the clock signals from the oscillator 4 is applied through the phase shifter 5 to the phase detector 3, which introduces a linear damping term into the control of the oscillator 4. The phase shifter 5 thus produces a phase shift of the oscillation from the clock oscillator 4 such as to tend to reduce the error output signal from the detector 3, and in this way damps the hunting which would otherwise occur. The decision clock signal from the phase shifter 5 tends to zero phase shift with respect to the incoming digital signals so that the decision clock signal is a suitable signal for operating the decision circuit which identifies the incoming digital signals. In the apparatus shown the trigger 15 constitutes the decision circuit and is set to a condition representing the digit of the incoming digital signal at the time.

The clock signal derived directly from the oscillator 4, however, is substantially independent of the jitter of the incoming digital signal because this has been attenuated by the integrator 8. Therefore, the output clock signal on the conductor 12 is substantially free from jitter and can be used for timing the outgoing digital signals, which process is effected by the trigger 16 which responds to the state of the trigger 15. The regenerated output signals appear on the conductor 17 and are fed to the output terminal 18 of the apparatus.

Although the invention has been described with reference to a single example, it will be appreciated that many modifications could be made to the circuit without departing from the invention. For example, it would be possible to use a voltage controlled oscillator responsive to the time integral of the error output signal from the detector 3 together with a linear damping component as in a conventional second order phase locked loop. The oscillator would, therefore, provide the decision clock signal and its output would also be fed directly to the phase detector 3. In such a circuit the phase shifter 5 receives the output of the oscillator and is arranged to produce the output clock signal by removing the effect of the linear damping component under the control of the control voltage applied to the oscillator. This circuit arrangement has the disadvantage that the phase shifter 5 is operated in an open-ended manner and is not included in a feedback loop.

I claim:

1. Apparatus for regenerating digital signals having means for producing first and second oscillations, means for comparing the first oscillation with an input digital signal to produce an error signal representing the phase difference between the first oscillation and the input digital signal, the frequency of the first oscillation being dependent on the time integral of the error signal the integral incorporating a damping term, and the frequency of the second oscillation being dependent on the time integral of the error signal without a damping term, and means responsive to the second oscillation to form regenerated digital signal in response to the input digital signals.

2. Apparatus according to claim 1, in which the means for producing first and second oscillations includes a oscillator of controllable frequency, integrating means connected to receive the error signal and to produce a control signal dependent on the time integral of the error signal and incorporating the damping term, the control signal being applied to the oscillator to control its frequency, and controllable phase shifting means effective on the oscillation from the oscillator, the phase shifting means being controlled by the control signal, the first and second oscillations being derived directly from the output of the oscillator and from the output of the phase shifting means respectively.

3. Apparatus according to claim 1, including integrating means responsive to the error signal to produce a control signal dependent on the time integral of the error signal without a damping term, and the means for producing first and second oscillations includes a of controllable frequency oscillator responsive to the control signal to generate the second oscillation and a phase shifter effective on second oscillation from the output of the frequency controllable oscillator and responsive to the control signal to produce the first oscillation.

4. Apparatus according to claim 1, in which the means for forming the regenerated signals includes first and second bistable trigger circuits, the first trigger circuit being connected to receive the input digital signals and to be switched in response to the first oscillation to states dependent on the input digital signals, and the second trigger circuit being connected to the first trigger circuit and to be switched in response to the second oscillation to states dependent on those of the first trigger circuit, the regenerated signals being derived from a connection to an output of the second trigger circuit.

5. Apparatus according to claim 2, in which the means for forming the regenerated signals includes first and second bistable trigger circuits, the first trigger circuit being connected to receive the input digital signals and to be switched in response to the first oscillation to states dependent on the input digital signals, and the second trigger circuit being connected to the first trigger circuit and to be switched in response to the second oscillation to states dependent on those of the first trigger circuit, the regenerated signals being derived from a connection to an output of the second trigger circuit.

6. Apparatus according to claim 3, in which the means for forming the regenerated signals includes first and second bistable trigger circuits, the first trigger circuit being connected to receive the input digital signals and to be switched in response to the first oscillation to states dependent on the input digital signals, and the second trigger circuit being connected to the first trigger circuit and to be switched in response to the second oscillation to states dependent on those of the first trigger circuit, the regenerated signals being derived from a connection to an output of the second trigger circuit.

* * * * *